(12) United States Patent
Dona et al.

(10) Patent No.: US 10,814,861 B2
(45) Date of Patent: Oct. 27, 2020

(54) SYSTEMS AND METHODS FOR CONTROLLING ENGINE SPEED IN A HYBRID VEHICLE

(71) Applicant: Ford Global Technologies, LLC, Dearborn, MI (US)

(72) Inventors: Alan Robert Dona, Huntington Woods, MI (US); Shunsuke Okubo, Belleville, MI (US); Carol Louise Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 15/658,108

(22) Filed: Jul. 24, 2017

(65) Prior Publication Data

US 2019/0023260 A1    Jan. 24, 2019

(51) Int. Cl.
| | |
|---|---|
| *B60W 30/188* | (2012.01) |
| *B60W 20/15* | (2016.01) |
| *B60K 6/445* | (2007.10) |
| *F02D 31/00* | (2006.01) |
| *F02D 29/02* | (2006.01) |

(Continued)

(52) U.S. Cl.
CPC ............... *B60W 20/15* (2016.01); *B60K 6/44* (2013.01); *B60K 6/445* (2013.01); *B60K 6/46* (2013.01); *B60W 10/06* (2013.01); *B60W 10/08* (2013.01); *B60W 10/10* (2013.01); *B60W 20/11* (2016.01); *B60W 20/30* (2013.01); *B60W 30/188* (2013.01); *B60W 30/1882* (2013.01); *F02D 29/02* (2013.01); *F02D 31/001* (2013.01); *F02D 41/023* (2013.01); *F02D 41/107* (2013.01); *B60W 2510/0638* (2013.01); *B60W 2510/1005* (2013.01); *B60W 2510/244* (2013.01); *B60W 2510/246* (2013.01); *B60W 2520/10* (2013.01); *B60W 2530/209* (2020.02); *B60W 2540/10* (2013.01); *B60W 2540/12* (2013.01); *B60W 2710/0644* (2013.01); *B60W 2710/0661* (2013.01); *B60W 2710/1005* (2013.01); *B60Y 2200/92* (2013.01); *B60Y 2300/52* (2013.01);

(Continued)

(58) Field of Classification Search
CPC .................................................. B60W 30/188
See application file for complete search history.

(56) References Cited

U.S. PATENT DOCUMENTS

| | | |
|---|---|---|
| 7,789,795 B2 | 9/2010 | McKenzie et al. |
| 8,041,495 B2 | 10/2011 | Kozarekar et al. |

(Continued)

*Primary Examiner* — Imran K Mustafa

(74) *Attorney, Agent, or Firm* — David Kelley; McCoy Russell LLP

(57) ABSTRACT

Methods and systems are provided for controlling an engine speed in a hybrid vehicle system during steady-state conditions and in response to transient acceleration and/or deceleration requests. In one example, an engine speed is controlled to an optimal engine speed for fuel economy during steady-state conditions, and in response to an acceleration or deceleration request, a target engine speed is obtained from a rate-limited optimal engine speed to vehicle speed ratio, and the engine is controlled to the target engine speed provided the target speed is below a threshold difference from optimal engine speed. In this way, the vehicle system may simulate a fixed ratio transmission during accelerations and decelerations, while maintaining optimal engine speed for fuel economy at steady state.

10 Claims, 6 Drawing Sheets

(51) Int. Cl.

| | | |
|---|---|---|
| *B60W 20/11* | (2016.01) | |
| *B60W 10/08* | (2006.01) | |
| *B60K 6/44* | (2007.10) | |
| *B60K 6/46* | (2007.10) | |
| *B60W 10/06* | (2006.01) | |
| *B60W 10/10* | (2012.01) | |
| *B60W 20/30* | (2016.01) | |
| *F02D 41/02* | (2006.01) | |
| *F02D 41/10* | (2006.01) | |

(52) U.S. Cl.
CPC ..... *F02D 2200/0625* (2013.01); *Y10S 903/93* (2013.01); *Y10S 903/945* (2013.01)

(56) References Cited

U.S. PATENT DOCUMENTS

| | | |
|---|---|---|
| 8,657,045 B2 | 2/2014 | Wang et al. |
| 8,831,842 B2 | 9/2014 | Dufford |
| 8,998,770 B2 | 4/2015 | Wang et al. |
| 9,108,505 B2 | 8/2015 | Supina |
| 2012/0059565 A1 | 3/2012 | Kozarekar et al. |
| 2014/0067180 A1* | 3/2014 | Tagawa ................. B60K 6/445 701/22 |
| 2014/0195090 A1* | 7/2014 | Takeuchi .............. F02D 11/105 701/22 |
| 2014/0243149 A1 | 8/2014 | Holmes et al. |
| 2015/0032309 A1 | 1/2015 | Liang et al. |
| 2015/0127200 A1* | 5/2015 | Takeuchi .............. B60W 10/10 701/22 |
| 2015/0283996 A1 | 10/2015 | Wang et al. |

\* cited by examiner

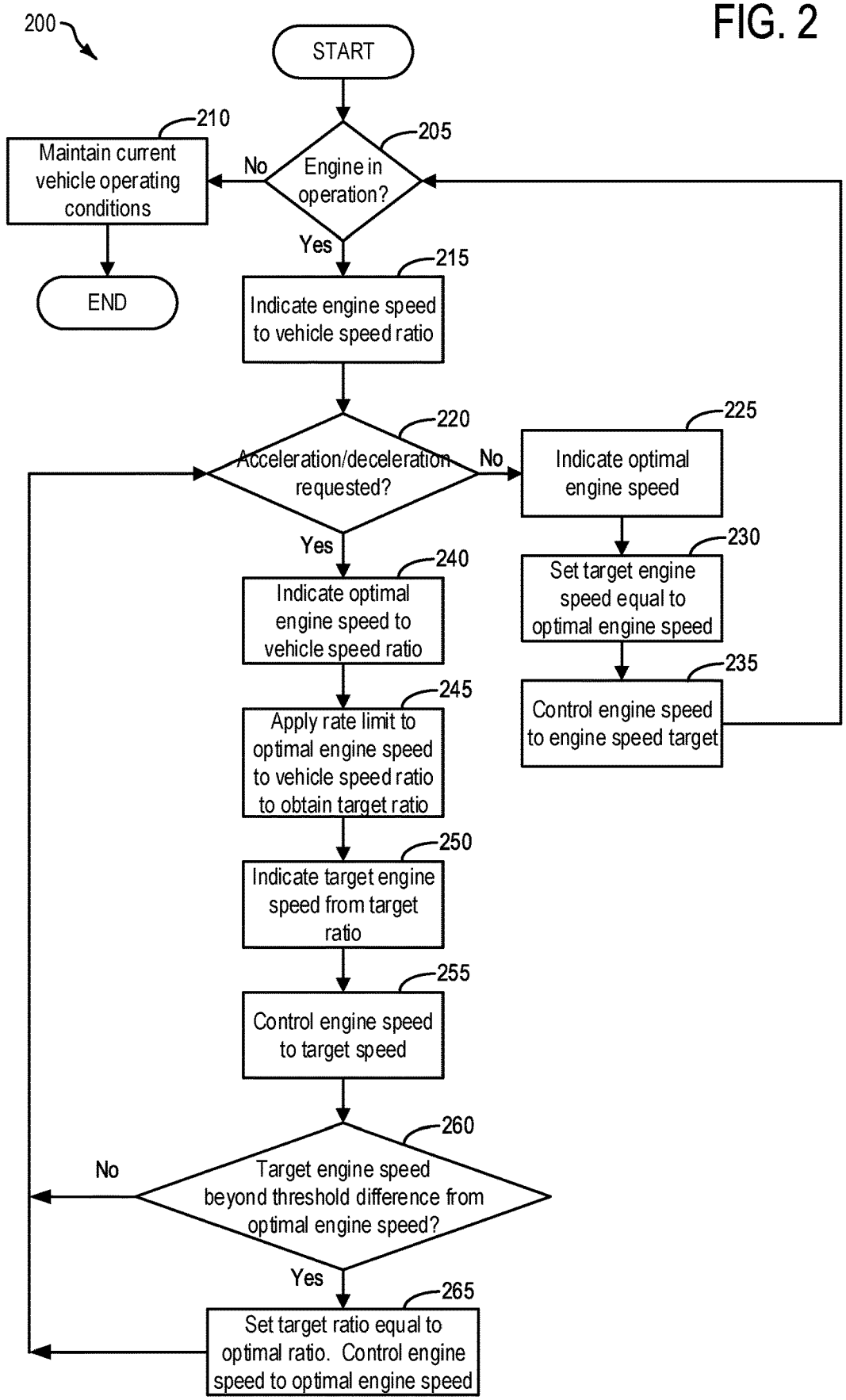

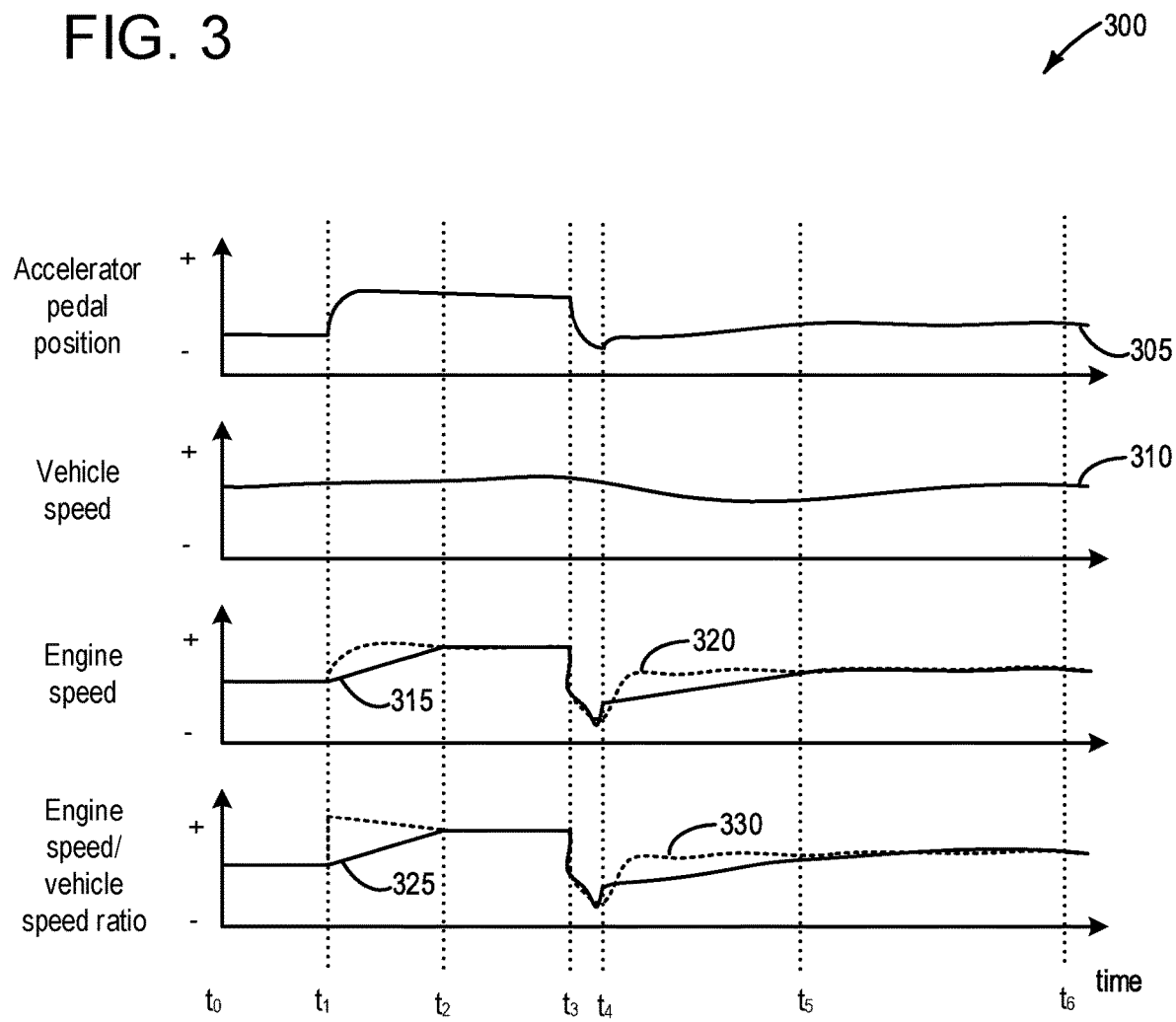

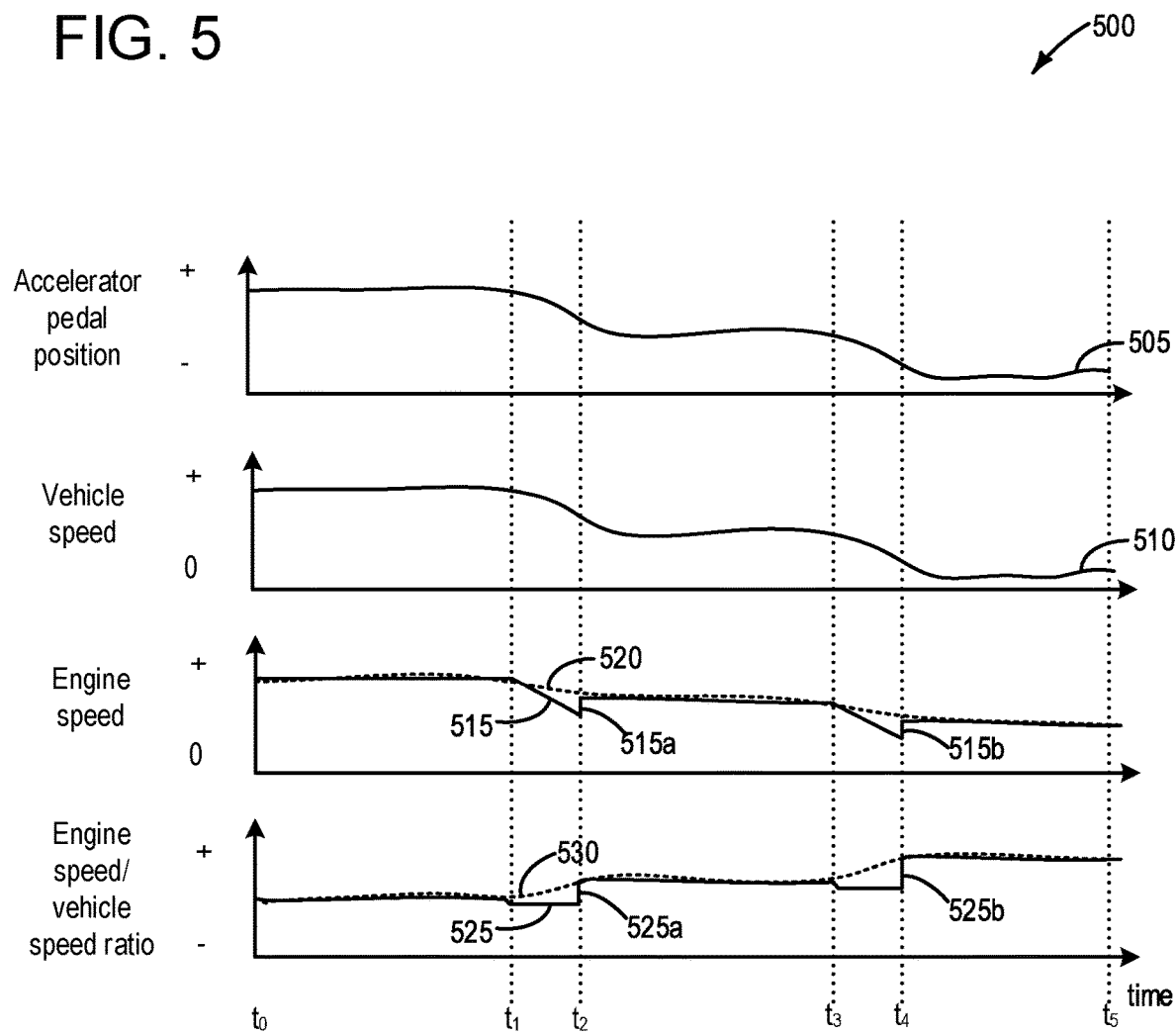

SYSTEMS AND METHODS FOR CONTROLLING ENGINE SPEED IN A HYBRID VEHICLE

FIELD

The present description relates generally to methods and systems for controlling a hybrid vehicle engine speed to simulate a fixed ratio transmission during transient operating conditions, while controlling engine speed to an optimal engine speed for fuel economy during steady-state conditions.

BACKGROUND/SUMMARY

Hybrid electric vehicle (HEV) powertrains such as power-split hybrids and series hybrids enable engine speed to be selected independently from vehicle speed, and modified at a rate that is independent of vehicle acceleration. Alternatively, a vehicle equipped with a manual or automatic step-ratio transmission operates with engine speed as a fixed ratio of vehicle speed. More specifically, except during a shift from one of the available gear ratios to another, the engine speed and rate of change of engine speed is coupled to the vehicle speed, and acceleration or deceleration thereof.

The ability to decouple engine speed from vehicle speed provides a key enabler to improving fuel economy. For example, the engine may be operated at the most efficient operating point given a requested driver power demand and/or to charge or discharge the battery, thereby maximizing a conversion efficiency of the engine and thereby minimizing powertrain losses.

However, the ability to change engine speed independently of the vehicle speed may in some examples result in engine speed behavior that is unintuitive to a vehicle operator accustomed to a vehicle powertrain with a step-ratio transmission, for example. In one approach, given the independent nature of engine speed, it may be possible to constrain an engine speed to vehicle speed ratio to a set of fixed gear ratios, however this may come at the expense of improvements in fuel economy.

The inventors herein have recognized these issues, and have developed systems and methods to at least partially address them. In one example, a method is provided comprising controlling an engine that propels a vehicle to an optimal engine speed for fuel economy during steady-state conditions. In response to an acceleration or deceleration request, the method may include applying a rate limit to an optimal engine speed to vehicle speed (E/V) ratio for fuel economy to obtain a target E/V ratio, and may further include controlling the engine to a target speed provided the target speed is below a threshold difference from optimal engine speed. In this way, engine speed may be selected such that key behaviors of a step ratio transmission may be emulated, namely that the rate of change of engine speed is coupled to the rate of vehicle acceleration/deceleration, while operating the engine at the optimal engine speed for fuel economy during steady-state operation.

In one example, the vehicle may comprise a hybrid vehicle, where engine speed is controllable independent of vehicle speed. For example, the hybrid vehicle may comprise a series hybrid or a power-split hybrid.

In another example, responsive to the target speed being beyond the threshold difference from optimal engine speed, the method may include setting the target E/V ratio equal to the optimal E/V ratio, and may further include controlling the engine to the optimal engine speed based on the optimal E/V ratio. In such an example, the method may include shifting a gear ratio in a transmission configured to transfer engine torque to one or more wheels of the vehicle to a lower gear ratio than a previous gear ratio concurrent with setting the target E/V ratio equal to the optimal E/V ratio and controlling the engine to the optimal speed based on the optimal E/V ratio.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a high-level example method for controlling engine speed in the hybrid electric vehicle system.

FIG. 3 shows an example timeline for controlling engine speed during steady-state vehicle operating conditions, with transient accelerations/decelerations, according to the method depicted in FIG. 2.

FIG. 5 shows an example timeline for controlling engine speed during deceleration conditions to simulate downshifts, according to the method depicted in FIG. 2.

DETAILED DESCRIPTION

Figure 4:
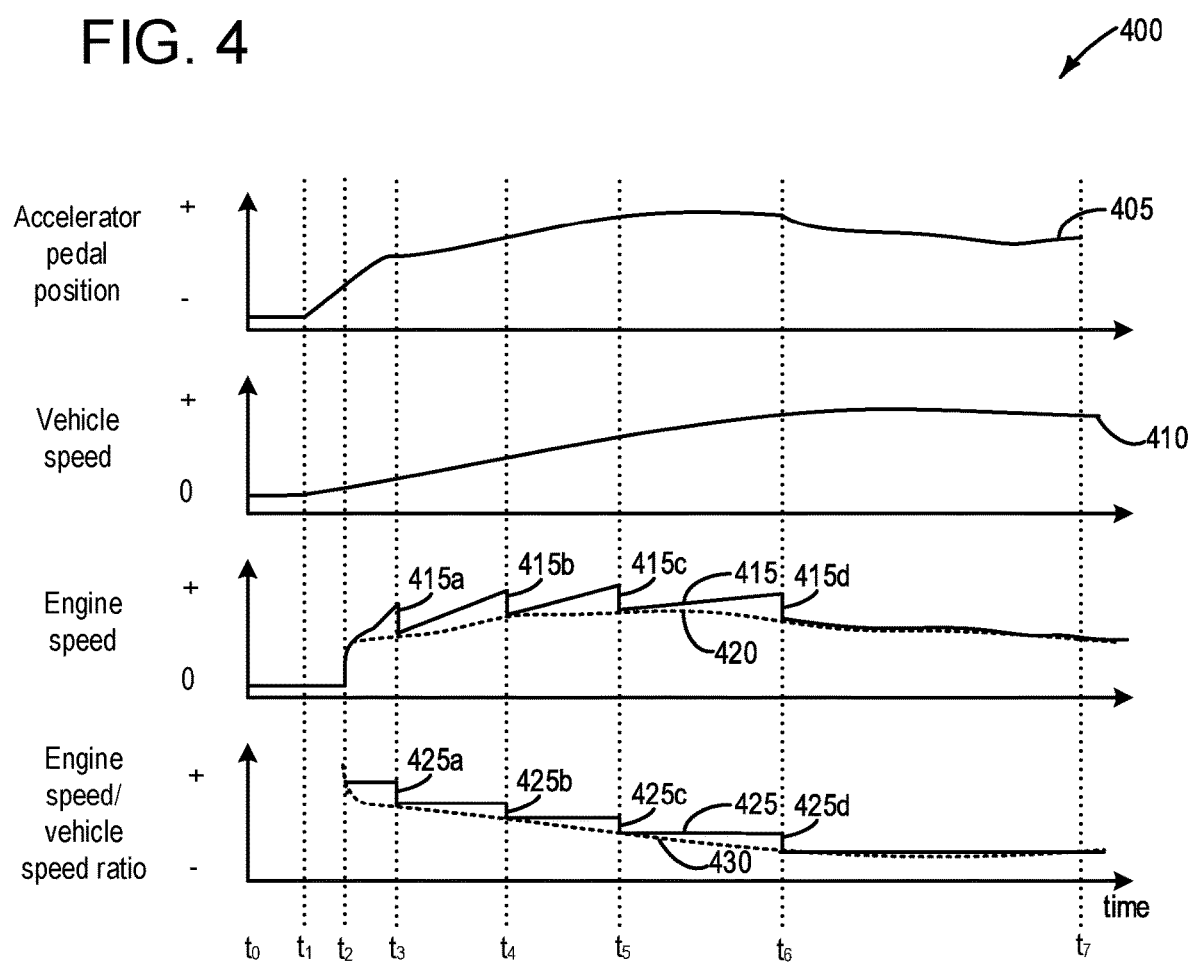
FIG. 4 shows an example timeline for controlling engine speed during an acceleration from rest, according to the method depicted in FIG. 2.

The following description relates to systems and methods for engine speed control which emulate key behaviors of a step-ratio transmission, namely that a rate of change of engine speed is tied to a rate of vehicle acceleration/deceleration, while operating the engine at an optimal speed for fuel economy benefits during steady-state operation. Discussed herein, it may be understood that steady-state operation comprises a substantially constant accelerator pedal position, such that the vehicle is not undergoing substantial acceleration or deceleration. Such methods may be applied to a hybrid vehicle capable of controlling engine speed independently of vehicle speed, such as the hybrid electric vehicle illustrated at FIG. 1A. Such a hybrid vehicle may include a combustion engine, such as that depicted at FIG. 1B. A method for emulating the key behaviors of a step-ratio transmission, while operating the engine at the optimal speed for fuel economy benefits during steady-state operation, is depicted at FIG. 2. An example timeline for controlling engine speed during steady-state operation with transient accelerations/decelerations, is depicted at FIG. 3. An example timeline for tying the rate of engine speed to a rate of vehicle acceleration during an acceleration from rest, is illustrated at FIG. 4.

Figure 1A:
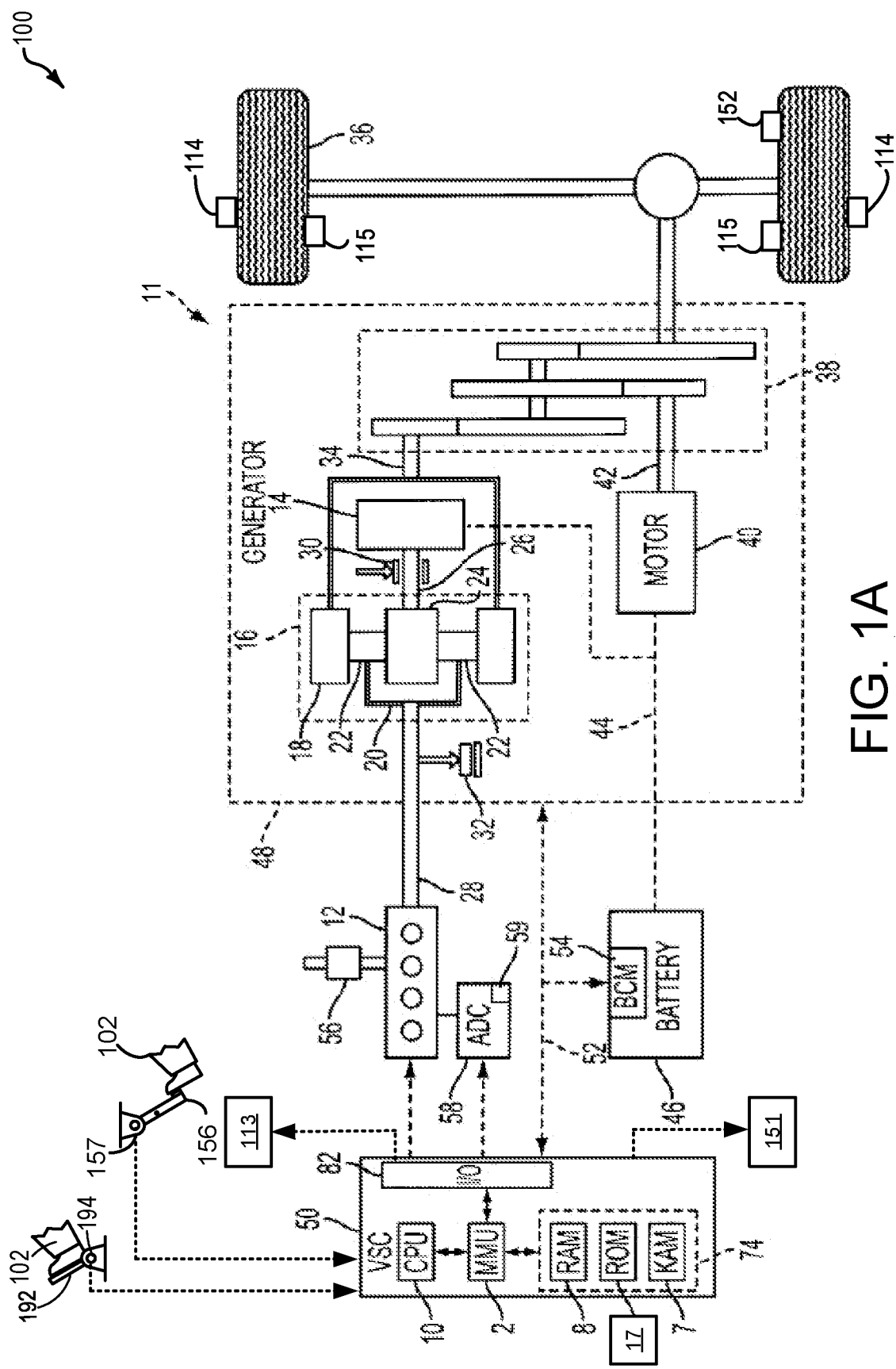
FIG. 1A shows an example powertrain in a hybrid electric vehicle (HEV) system.

Turning now to the figures, FIG. 1A includes a schematic block diagram representation of a vehicle system 100 to illustrate one embodiment of a system or method for controlling a vehicle powertrain according to the present invention. Vehicle system 100 generally represents any vehicle having a hybrid electric powertrain with an internal combustion engine (ICE) 12. In the depicted embodiment, the vehicle system 100 is a hybrid electric vehicle (HEV) system wherein the powertrain 11 includes an internal combustion engine 12, a battery 46, and an electrical machine (e.g., a motor and/or a generator). However, it will be appreciated that in alternate embodiments, the control methods discussed herein may be applied to other hybrid vehicle configurations such as a series hybrids. In a case where the vehicle system 100 comprises a series hybrid, it may be understood that such a vehicle may only receive mechanical power from an electric motor, which may be run either by a battery or a gasoline-powered engine that runs a generator, for example.

The vehicle powertrain 11 includes engine 12 and an electric machine coupled to the engine via a gearset (herein depicted as generator 14). As such, generator 14 may also be referred to as an electric machine as it may operate as either a motor or a generator. Engine 12 and generator 14 are connected through a power transfer unit or transmission, which in this embodiment is implemented by a planetary gearset 16. Planetary gearset 16 includes a ring gear 18, a carrier 20, planet gears 22, and a sun gear 24. Other types of power transfer units, including other gearsets and transmissions, may be used to connect engine 12 to generator 14. It may be understood that the powertrain 11 may be configured in various manners including as a parallel, a series, or a series-parallel hybrid vehicle. Furthermore, it may be understood that vehicle system 100 may in some examples comprise a vehicle in which there is no opportunity to change transmission gear ratios, however vehicle system 100 may in some other examples comprise a vehicle in which transmission gear ratio changes may be possible. For example, the vehicle system 100 may in some examples comprise powersplit, series, or continuously variable powertrains that may have shiftable gears, or in other words, may have the ability to change transmission gear ratios.

Generator 14 can be used to provide electric current to charge battery 46 or operate motor 40. Alternatively, generator 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from generator 14 to engine 12, a one-way clutch 32 is provided so that shaft 28 rotates in only one direction. In addition, generator 14 can be used to control the rotational speed of engine 12 via planetary gearset 16 and shaft 28 when and if desired.

Ring gear 18 is connected to a shaft 34, which is connected to vehicle drive wheels 36 through a second gearset 38. Vehicle system 100 further includes a motor 40, which can be used to output torque to shaft 42. Motor 40 may also be referred to as an electric machine as it may operate as either a motor or a generator. In particular, battery 46 may be configured to power the electric machine and operate it as a motor. Other vehicles within the scope of the present invention may have different electric machine arrangements, such as more or less than the two electric machines (generator 14 and motor 40) depicted herein. In the embodiment shown in FIG. 1A, both electric machines 14, 40 may be operated as motors using electric current from battery 46 or another source of electric current to provide a desired output torque. Alternatively, both electric machines 14, 40 may be operated as generators supplying electrical power to a high voltage bus 44 and/or to an energy storage device, represented by high voltage battery 46. Other types of energy storage devices and/or output devices that can be used include, for example, a capacitor bank, a fuel cell, a flywheel, etc.

As shown in FIG. 1A, motor 40, generator 14, planetary gear set 16, and a portion of second gear set 38 may generally be referred to as a transaxle 48. One or more controllers 50 implemented in hardware and/or software are provided to control engine 12 and the components of transaxle 48. In the embodiment of FIG. 1A, controller 50 is a vehicle system controller (VSC). Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as generator 14 and/or motor 40.

Any or all of the various controllers or control modules, such as VSC 50 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 17, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

Controller 50 may receive an indication of an operator requested output of the vehicle propulsion system 100 from a human operator 102, or an autonomous controller. For example, controller 50 may receive sensory feedback from pedal position sensor 194 which communicates with pedal 192. Pedal 192 may refer schematically to an accelerator pedal. Similarly, controller 50 may receive an indication of an operator requested vehicle braking via a human operator 102, or an autonomous controller. For example, controller 50 may receive sensory feedback from pedal position sensor 157 which communicates with brake pedal 156.

Vehicle system 100 may also include one or more emission control devices 56. These may include, for example, a carbon canister for collecting fuel vapors to reduce emissions. From time to time, the carbon canister may be purged, such that collected vapors are taken into the engine air intake system and combusted. Emission control device 56 may also include one or more catalysts or catalytic reactors in various configurations to treat exhaust gases of engine 12. In addition to emissions control or device 56, vehicle system 100 may also include one or more engine or motor driven accessories (AC/DC) 58. Since the accessories 58 use torque produced by engine 12 and/or electrical energy from battery 46 and/or electrical machines 14, 40, one or more of the accessories 58 may be selectively controlled by VSC 50 to more accurately control torque production of engine 12 when operating near the combustion stability limit. For example, an air conditioning system may include a compressor 59 whose operation is adjusted by the controller during selected operating modes to more accurately control operation of engine 12.

In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 50 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in further detail below, ABS 113 may command an increased brake pressure at one or more wheels in order to prevent forward motion of the vehicle responsive to a slowing of the engine 12. Herein, increasing brake pressure at one or more wheels via ABS 113 may be referred to as activating, or applying one or more wheel brakes.

Vehicle system 100 may in some examples further include an electronic parking brake system 151. Electronic parking brake system may be utilized in conjunction with the vehicle controller 50, to engage, or release, electronic parking brake(s) 152, for example. In some examples, the electronic brake system 151 may be utilized by the vehicle controller to engage the electronic parking brake(s) 152 while the engine 12 is spinning down after accelerating the engine as discussed above.

Figure 1B:
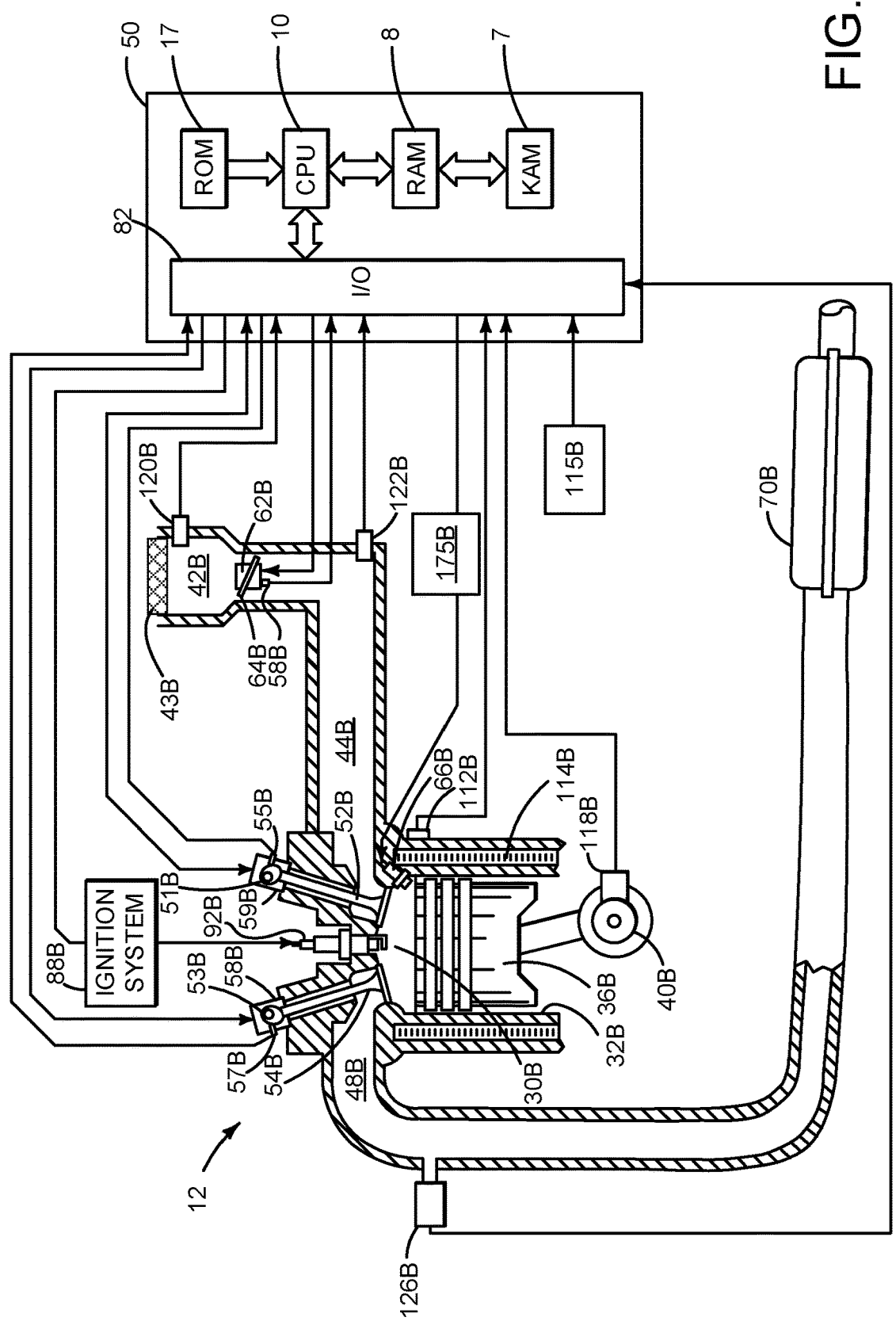
FIG. 1B shows a sketch of an engine of the hybrid electric vehicle system.

Referring to FIG. 1B, a detailed view of internal combustion engine 12, comprising a plurality of cylinders, one cylinder of which is depicted in FIG. 1B, is shown. Engine 12 is controlled by controller 50. Engine 12 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from controller 50. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to controller 50. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Controller 50 is shown in FIG. 1B as a conventional microcomputer including: microprocessor unit 10, input/output ports 82, read-only memory 17 (e.g., non-transitory memory), random access memory 8, keep alive memory 7, and a conventional data bus. Other controllers mentioned herein may have a similar processor and memory configuration. Controller 50 is shown receiving various signals from sensors coupled to engine 12, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by controller 50. In a preferred aspect of the present description, engine position sensor 118B produces a predetermined number of equally spaced pulses every revolution of the crankshaft from which engine speed (RPM) can be determined. Controller 50 may in some examples receive input from human/machine interface 115B (e.g., pushbutton or touch screen display).

During operation, each cylinder within engine 12 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Turning now to FIG. 2, a high-level example method 200 for controlling engine speed in a hybrid vehicle system (e.g. 100), is shown. More specifically, method 200 may include differentially controlling engine speed depending on vehicle operating conditions. Differentially controlling engine speed may comprise tying a rate of change of engine speed to a rate of vehicle acceleration/deceleration under conditions where the vehicle is accelerating/decelerating, while alternatively operating the engine at an optimal speed for fuel economy during steady-state operation.

Method 200 will be described with reference to the systems described herein and shown in FIGS. 1A-1B, though it should be understood that similar methods may be applied to other systems without departing from the scope of this disclosure. Method 200 may be carried out by a controller, such as controller 50 in FIG. 1A, and may be stored at the controller as executable instructions in non-transitory memory. Instructions for carrying out method 200 and the rest of the methods included herein may be executed by the controller based on instruction stored on a memory of the controller and in conjunction with signals received from sensors of the engine system, such as the sensors described above with reference to FIGS. 1A-1B. The controller may employ engine system actuators such as throttle (e.g. 62B), spark plug(s) (e.g. 92B), fuel injector(s) (e.g. 66B), etc., according to the method depicted below.

Method 200 begins at 205, and may include indicating whether the engine (e.g. 12) is in operation. It may be indicated that the engine is in operation, if it is indicated that the engine is combusting air and fuel. For example, the engine may be in operation if fuel is being injected into one or more combustion chambers (e.g. 30B) of one or more engine cylinders, if spark is being provided to the one or more engine cylinders via one or more spark plugs (e.g. 92B), etc. If, at 205, it is indicated that the engine is not in operation, method 200 may proceed to 210. At 210, method 200 may include maintaining current vehicle operating conditions. For example, if the vehicle is being operated in an electric-only mode of operation, then electric-only operation may be continued. Method 200 may then end.

Returning to 205, responsive to an indication that the engine is in operation, method 200 may proceed to 215. At 215, method 200 may include determining an engine speed to vehicle speed ratio. For example, an engine position sensor (e.g. 118B) may be utilized to indicate engine speed (e.g. RPM), and one or more wheel sensors (e.g. 114) may be utilized to indicate vehicle speed.

Responsive to the engine speed to vehicle speed ratio being determined at step 215, method 200 may proceed to 220. At 220, method 200 may include indicating whether vehicle acceleration or deceleration is requested by a vehicle operator. For example, an acceleration request may be indicated via the controller in response to a vehicle operator (e.g. 102) pressing down on an accelerator pedal (e.g. 192). Alternatively, a deceleration request may be indicated via the controller in response to a vehicle operator releasing pressure applied on the accelerator pedal. In still other examples, a deceleration request may include a vehicle operator pressing down on a brake pedal (e.g. 156).

If, at 220, an acceleration or deceleration request is not indicated, method 200 may proceed to 225. It may be understood that, if it is indicated that acceleration/deceleration is not requested, then the vehicle is operating at a steady-state condition. At 225, method 200 may include determining an optimal engine speed (RPM) for fuel economy benefits. In other words, the optimal engine speed may comprise an engine speed that is optimal for conserving fuel, or for utilizing fuel most effectively. The optimal engine speed (and optimal engine speed to vehicle speed ratio) may be a function of vehicle speed, driver demanded wheel torque (corresponding to wheel power), battery state of charge, battery temperature, transmission gearing state, fuel storage level, etc. In response to determining the optimal engine speed at 225, method 200 may proceed to 230. At 230, method 200 may include setting a target engine speed equal to the optimal engine speed that was indicated at step 225. In other words, a controller (e.g. 50) may set a target engine speed equal to the optimal engine speed.

Proceeding to 235, method 200 may include controlling engine speed to the target engine speed (or maintaining engine speed at the target engine speed). One or more engine actuators may be utilized to control engine speed to the target engine speed, or to maintain engine speed at the target engine speed. For example, the controller may control a position of a throttle (e.g. 62B), to control an amount of air ingested by the engine, adjust spark timing provided to one or more engine cylinder combustion chambers via one or more spark plugs (e.g. 92B), increase or decrease fuel injection to the one or more engine cylinder combustion chambers via one or more fuel injectors (e.g. 66B), etc. With the engine speed controlled to the target engine speed, it may be understood that the engine speed to vehicle speed ratio may comprise an optimal engine speed to vehicle speed ratio for fuel economy benefits, during steady state conditions where acceleration/deceleration is not requested. In other words, while the vehicle is cruising at steady state conditions, the engine speed may be controlled to the optimal engine speed such that fuel economy benefits may be realized.

With the engine speed controlled to the optimal engine speed, and as such, with the engine operating at an optimal engine speed for fuel economy, method 200 may return to 205. In this way, method 200 may respond to changing conditions while the vehicle is being propelled, at least in part, via the engine.

Returning to 220, if it is indicated that acceleration/deceleration is requested, method 200 may proceed to 240. At 240, method 200 may include indicating an optimal engine speed to vehicle speed ratio. The optimal engine speed to vehicle speed ratio may be a function of fuel economy, battery SOC, driver demand, transmission gear state, battery temperature, fuel storage level, etc. It may be understood that in a case where a vehicle is cruising, and there is a change in accelerator pedal position, such a change in accelerator pedal position thus may result in a change in wheel power demand, and a corresponding change in the optimal engine speed for fuel economy benefits. However, if the engine speed were allowed to match the optimal engine speed in response to changes in accelerator pedal position, there may be circumstances where engine speed behavior may be unintuitive to a driver accustomed to a step-ratio transmission. In other words, during an acceleration/deceleration event (also referred to herein as a transient), the optimal engine speed may change at a rate that is unintuitively fast or slow relative to vehicle acceleration. As such, the equivalent optimal engine speed to vehicle speed ratio may thus continuously be changing during an acceleration/deceleration (e.g. during transients). As mentioned above, in a vehicle propulsion system such as that described with regard to FIG. 1A, it may be possible to constrain an engine speed to vehicle speed ratio to a set of fixed gear ratios, however such a solution may sacrifice an opportunity to improve fuel economy.

Accordingly, proceeding to 245, method 200 may include applying a rate limit to the optimal engine speed to vehicle speed ratio, to determine a target engine speed to vehicle speed ratio. It may be understood that the rate limit may comprise an algorithm stored at a controller (e.g. 50) of the vehicle.

The rate limit may be applied to the optimal engine speed to vehicle speed ratio determined at 240, such that a target engine speed to vehicle speed ratio may be indicated. The rate limit may be a function of a level of requested acceleration/deceleration, engine speed, vehicle speed, transmission gear state, whether or not the vehicle is being propelled at least in part, via a motor (e.g. 40), etc. In other words, the rate limit may be variable depending on a number of vehicle operating conditions.

Responsive to the target engine speed to vehicle speed ratio being indicated at 245, method 200 may proceed to 250. At 250, method 200 may include determining or calculating a target engine speed from the target engine speed to vehicle speed ratio. In other words, with the target engine speed to vehicle speed ratio determined at step 245, vehicle speed may be indicated, via wheel speed sensors (e.g. 114) for example. With the target ratio determined, and vehicle speed indicated, a target engine speed may be determined via the controller according to equation (1) defined below:

$$[\text{Target (Es/Vs) ratio}]=[\text{Target Es}]/[\text{Vs}]; \quad (1)$$

where Es is engine speed, and Vs is current vehicle speed.

Thus, as will be appreciated from equation (1), by multiplying vehicle speed (Vs) by the target engine speed to vehicle speed ratio, a target engine speed may be determined.

With the target engine speed determined at 250, method 200 may proceed to 255. At 255, method 200 may include controlling engine speed to the target engine speed. Similar to that discussed above at 235, at 255, controlling engine speed to the target engine speed may include utilizing one or more engine actuators to control engine speed to the target engine speed. Examples include controlling a position of a throttle (e.g. 62B), controlling sparking timing via one or more spark plugs (e.g. 92B), via increasing or decreasing fuel injection to one or more engine cylinder combustion chambers via one or more fuel injectors (e.g. 66B), etc. It may be understood that controlling engine speed to the target engine speed includes coupling engine speed and a rate of change of engine speed to vehicle speed. In other words, engine speed and the rate of change of engine speed are tied to vehicle speed, at 255, such that engine speed is not controlled independently of vehicle speed.

Proceeding to 260, method 200 may include indicating whether the target engine speed is beyond a predetermined threshold difference from the optimal engine speed, where the optimal engine speed may be understood to be indicated at step 240. For example, the predetermined threshold difference may comprise 30 RPM, 40 RPM, 50 RPM, 60 RPM, 70 RPM, 80 RPM, 90 RPM, or higher than 90 RPM.

If, at 260, it is indicated that the target engine speed is not beyond the threshold difference from the optimal engine speed, method 200 may return to 220, and may include indicating whether acceleration/deceleration is still requested. In other words, the vehicle operator may still be requesting vehicle acceleration, or requesting deceleration. Accordingly, method 200 may proceed from 220 to 260 as discussed above if acceleration/deceleration is requested under conditions where it was determined that the target engine speed was not beyond the threshold difference from the optimal engine speed. Furthermore, it may be appreciated that by returning to step 220 from step 260 of method 200, the sequence of controlling engine speed to the target engine speed as defined by steps 240-260 is continuously carried out for as long as the vehicle is accelerating/decelerating. In other words, it may be understood that during an acceleration/deceleration (e.g. transient) event, the optimal engine speed to vehicle speed ratio may be continuously changing depending on the acceleration/deceleration request and current vehicle speed, and as such, the rate limit may be continuously applied to the changing optimal engine speed to vehicle speed ratio, such that the target engine speed may be continuously updated.

Alternatively, if at 260, it is indicated that the target engine speed is beyond the predetermined threshold difference from the optimal engine speed, method 200 may proceed to 265. At 265, method 200 may include setting the target engine speed to vehicle speed ratio (indicated at step 245) equal to the optimal engine speed to vehicle speed to vehicle speed ratio (indicated at step 240), and may further include controlling engine speed to the optimal engine speed. Controlling engine speed to the optimal engine speed may include controlling a position of a throttle (e.g. 62B), controlling sparking timing via one or more spark plugs (e.g. 92B), increasing or decreasing fuel injection to one or more engine cylinder combustion chambers via one or more fuel injectors (e.g. 66B), etc. In other words, responsive to an indication that the target engine speed is beyond the threshold difference from the optimal engine speed, the target engine speed to vehicle speed ratio may be reset to the optimal engine speed to vehicle speed ratio, thereby bringing the engine speed back to the optimal speed for fuel economy benefits, while also emulating a step-ratio transmission (as will be discussed in further detail with regard to FIG. 4).

Furthermore, while not explicitly illustrated at step 265 of method 200, it may be understood that in some examples, the method may include shifting a gear ratio of a transmission (e.g. 16) configured to transfer engine torque to one or more wheels of the vehicle to a lower gear ratio than a previous gear ratio concurrent with setting the target engine speed to vehicle speed ratio equal to the optimal engine speed to vehicle speed ratio and controlling the engine to the optimal speed based on the optimal engine speed to vehicle speed ratio. Such examples may include powersplit, series, and/or continuously variable powertrains with the capability of changing gear ratios. In this way, a fixed ratio gear shift may be emulated by setting the target engine speed to vehicle speed ratio equal to the optimal engine speed to vehicle speed ratio, and controlling the engine to the optimal engine speed.

Subsequent to the setting the target engine speed to vehicle speed ratio to the optimal engine speed to vehicle speed ratio, method 200 may return to 220, where it may be indicated whether acceleration/deceleration is still requested. In other words, the sequence of controlling engine speed to the target engine speed while the difference between the target engine speed and the optimal engine speed is less than the predetermined threshold difference (steps 240-260), and/or controlling engine speed to the optimal engine speed in response to the difference between the target engine speed and the optimal engine speed being greater than the predetermined threshold difference (steps 240-265), may be continuously carried out for as long as the vehicle is accelerating/decelerating. As an example, in an acceleration from rest, there may be a plurality of times that the target engine speed to vehicle speed ratio may be set to the optimal engine speed to vehicle speed ratio, as will be discussed in further detail with regard to timeline 400 depicted below at FIG. 4. Each time the target engine speed to vehicle speed ratio is set to the optimal engine speed to vehicle speed ratio, such action may simulate an "upshift", for example.

Turning now to FIG. 3, an example timeline 300 for controlling engine speed in a hybrid vehicle during transient acceleration/deceleration events, and during steady state cruising conditions, is shown. Timeline 300 includes plot 305, indicating a position of an accelerator pedal (e.g. 192), over time. The accelerator pedal may be pressed down (+) toward a floor of the vehicle, or released (−). Timeline 300 further includes plot 310, indicating vehicle speed, over time. Vehicle speed may increase (+), or decrease (−) over time. Timeline 300 further includes plot 315, indicating a target engine speed, and plot 320, indicating an optimal engine speed, over time. Engine speed may increase (+), or decrease (−) over time. Timeline 300 further includes plot 325, indicating a target engine speed to vehicle speed ratio, and plot 330, indicating an optimal engine speed to vehicle speed ratio, over time. The engine speed to vehicle speed ratio may increase (+) or decrease (−), over time.

At time t0, the vehicle is being propelled at least in part via an engine. Between time t0 and t1, the vehicle speed is substantially constant, as the accelerator pedal position is substantially constant. Thus, engine speed is controlled to the target engine speed, where the target engine speed comprises the optimal engine speed for realizing fuel economy benefits. In other words, the target engine speed overlaps with the optimal engine speed between time t0 and t1.

Similarly, with engine speed controlled to the optimal engine speed, the engine speed to vehicle speed ratio comprises the optimal engine speed to vehicle speed ratio. In other words, the target engine speed to vehicle speed ratio overlaps with the optimal engine speed to vehicle speed ratio for realizing fuel economy benefits between time t0 and t1.

At time t1, the vehicle operator steps down on the accelerator pedal, thus requesting an increase in wheel torque (corresponding to wheel power). If engine speed were controlled based solely on fuel economy benefits, the optimal engine speed, indicated by plot 320, would rapidly increase in response to the increased wheel torque demand. However, such a rapid increase in engine speed may be unintuitive to the vehicle operator based on vehicle speed and accelerator pedal position. Similarly, if engine speed were controlled based solely on fuel economy benefits, the engine speed/vehicle speed ratio may rapidly increase in response to the increased wheel torque demand, which may similarly be unintuitive to the vehicle operator.

To avoid unintuitive engine speed behavior between time t1 and t2, the optimal engine speed to vehicle speed ratio may be determined as discussed above, and a rate limit may be applied to the optimal engine speed to vehicle speed ratio, in order to obtain a target ratio. Responsive to obtaining the target ratio, vehicle speed, indicated by plot 310, may be measured, and using equation (1) above together with vehicle speed and the target ratio, a target engine speed may be indicated.

Thus, by applying the rate limit between time t1 and t2, target engine speed increases in rate-limited fashion until converging with the optimal engine speed. Similarly, the target engine speed to vehicle speed ratio increases in rate-limited fashion until converging with the optimal engine speed to vehicle speed ratio. It may be understood that the target engine speed to vehicle speed ratio may converge to the optimal engine speed to vehicle speed ratio at a point when the target engine speed equals the optimal engine speed.

Thus, in the time period between time t1 and t2, it may be understood that the tip-in event (beginning at time t1) is not sufficient to result in a difference between the target engine speed and the optimal engine speed exceeding the predetermined threshold difference (discussed above at step 260 of method 200). Thus, between time t1 and t2, it may be understood that the method (e.g. method 200) is preventing engine speed from rapidly increasing in response to the tip-in. In other words, the method is preventing a "downshift" to a higher engine speed, such as may occur in a step-ratio vehicle under conditions where such a vehicle is cruising in top gear (for example), and where a vehicle operator tips-in to accelerate. In such an example, the step-ratio transmission may be controlled to maintain the transmission in top gear for a predetermined duration until one or more conditions are met, at which point the transmission may be controlled to downshift to a lower gear to provide acceleration at a higher engine speed. Similarly, between time t1 and t2, as engine speed is prevented from rapidly increasing in response to the tip-in of the accelerator pedal, it may be understood that the method is similarly preventing a simulated "downshift" to higher engine speed. However, if, between time t1 and t2, the vehicle operator were to step further into the accelerator pedal (not shown) such that the difference between target engine speed and optimal engine speed were to become beyond the threshold difference, then the control method (e.g. method 200) may rapidly "shift" to a higher speed to simulate a downshift. Shifting to a higher speed may comprise quickly raising engine speed to the optimal engine speed to simulate a downshift, for example.

Between time t2 and t3, accelerator pedal position remains substantially constant. In other words, it may be understood that between time t2 and t3, the vehicle is operating in a substantially constant vehicle speed cruise condition, or a steady-state condition. As discussed above, while the vehicle speed is substantially constant due to the accelerator pedal position remaining substantially constant, target engine speed is controlled to the optimal engine speed for fuel economy benefit. In other words, between time t2 and t3, the optimal engine speed is utilized as the engine speed target, thus resulting in the target engine speed to vehicle speed ratio equaling the optimal engine speed to vehicle speed ratio.

At time t3, the vehicle operator releases the accelerator pedal, indicating a desire for less wheel torque (corresponding to less wheel power). Similar to that described above for the increase in wheel torque demand between time t1 and t2, during a transient deceleration the optimal engine speed to vehicle speed ratio for fuel economy benefits may be indicated, and a target engine speed to vehicle speed ratio may be calculated by applying a rate limit to the optimal engine speed to vehicle speed ratio. Responsive to obtaining the target ratio, vehicle speed may be measured, and a target engine speed may be indicated according to equation (1) as discussed above.

Accordingly, between time t3 and t4, engine speed is controlled to the target engine speed. When the target speed is substantially similar to the optimal engine speed, it may be understood that the target engine speed to vehicle speed ratio is equivalent to the optimal engine speed to vehicle speed ratio. Similar to that discussed above for the time period between time t1 and t2, if the vehicle operator were to step further into the accelerator pedal (not shown) between time t3 and t4, such that target engine speed differs from the optimal engine speed by the threshold difference, it may be understood that under such conditions, engine speed may be rapidly controlled to the optimal engine speed, which may simulate a downshift event. Under conditions where a tip-in event is not sufficient to result in the difference between target engine speed and optimal engine speed exceeding the threshold difference, it may be understood that the control methodology may prevent a simulated downshift by rate-limiting engine speed as illustrated between time t3 and t4. In other words, the method (e.g. method 200) may involve preventing or inhibiting the downshift under conditions where a tip-in event is not sufficient to result in the difference between target engine speed and optimal engine speed being beyond the threshold difference, and in response to a tip-in where the difference between target engine speed and optimal engine speed exceeds the predetermined threshold, target speed may be rapidly controlled to optimal engine speed to simulate a downshift event.

At time t4, increased wheel torque is again requested by the vehicle operator, indicated by plot 305. Between time t4 and t5, the same procedure is conducted as that described between times t1 and t2. Briefly, an optimal engine speed to vehicle speed ratio (based on fuel economy benefits), is indicated, and a rate limit is applied to the optimal engine speed to vehicle speed ratio in order to obtain a target engine speed to vehicle speed ratio. Once the target engine speed to vehicle speed ratio has been indicated, vehicle speed may be indicated, and target engine speed may be determined via equation (1) as discussed above.

Accordingly, between time t4 and t5 target engine speed increases in rate-limited fashion until converging with the optimal engine speed. Similarly, the target engine speed to vehicle speed ratio increases in rate-limited fashion until converging with the optimal engine speed to vehicle speed ratio. As discussed above, it may be understood that the target engine speed to vehicle speed ratio may converge to the optimal engine speed to vehicle speed ratio when target engine speed equals the optimal engine speed.

Between time t5 and t6, accelerator pedal position remains substantially constant. While the vehicle speed is substantially constant due to the accelerator pedal position remaining substantially constant, engine speed is controlled to the optimal engine speed for fuel economy benefit, thus resulting in the target engine speed to vehicle speed ratio equaling the optimal engine speed to vehicle speed ratio.

Turning now to FIG. 4, an example timeline 400 for controlling engine speed in a hybrid vehicle during an acceleration from rest, is shown. Timeline 400 includes plot 405, indicating a position of an accelerator pedal (e.g. 192), over time. The accelerator pedal may be pressed down (+) toward a floor of the vehicle, or released (−). Timeline 400 further includes plot 410, indicating vehicle speed, over time. Vehicle speed may increase (+), compared to a stopped vehicle (0), over time. Timeline 400 further includes plot 415, indicating a target engine speed, and plot 420, indicating an optimal engine speed, over time. Engine speed may increase (+), compared to a stopped vehicle (0) over time. Timeline 400 further includes plot 425, indicating a target engine speed to vehicle speed ratio, and plot 430, indicating an optimal engine speed to vehicle speed ratio, over time. The engine speed to vehicle speed ratio may increase (+) or decrease (−), over time.

Between time t0 and t1, the vehicle is stopped, indicated by plot 410, with the engine off, indicated by plot 415. The accelerator pedal is not being depressed, indicated by plot 405. At time t1, the accelerator pedal is pressed down by a vehicle operator, indicating a request for wheel torque (corresponding to wheel power) to accelerate the vehicle from rest.

Between time t1 and t2 vehicle speed increases slightly, but the engine remains off. Thus, while not explicitly shown, it may be understood that the vehicle may be initially accelerated via electrical power, for example via a motor (e.g. 40). At time t2, it may be understood that driver demand is such that the engine is activated. For example, engine activation may comprise initiating the engine to start combusting air and fuel.

Engine speed rapidly increases between time t2 and t3, indicated by plot 415. As the vehicle is accelerating, it may be understood that a controller of the vehicle indicates an optimal engine speed to vehicle speed ratio (indicated by plot 430) for fuel economy benefits, and a rate limit is applied to the optimal engine speed to vehicle speed ratio in order to obtain a target engine speed to vehicle speed ratio. Once the target engine speed to vehicle speed ratio has been indicated, vehicle speed may be indicated, and target engine speed may be determined via equation (1) as discussed above.

Accordingly, between time t2 and t3, engine speed is increased corresponding to the target engine speed determination, indicated by plot 415. Under conditions where the vehicle is accelerating from rest where the engine is increasing engine speed to the target engine speed, the target engine speed to vehicle speed ratio is maintained substantially constant, as indicated by plot 425 between time t2 and t3. As illustrated, target engine speed, indicated by plot 415, differs from optimal engine speed (for fuel economy benefits), indicated by plot 420. Similarly, the target engine speed to vehicle speed ratio, indicated by plot 425, differs from the optimal engine speed to vehicle speed ratio, indicated by plot 430.

At time t3, it may be understood that the target engine speed differs from the optimal engine speed by a predetermined threshold difference. Accordingly, when such a threshold difference is indicated, target engine speed is rapidly controlled to the current optimal engine speed. The rapid change in target engine speed to the optimal engine speed is denoted as 415a. By controlling engine speed to the optimal engine speed, the target engine speed to vehicle speed ratio, indicated by plot 425, is set to a current optimal engine speed to vehicle speed ratio, indicated by plot 430. The rapid change in the target engine speed to vehicle speed ratio, to become the current optimal engine speed to vehicle speed ratio, is denoted as 425*a*.

A similar procedure takes place between time t3 and t4, between time t4 and t5, and between time t5 and t6. In each case, a rate limit is applied to an indicated current optimal engine speed to vehicle speed ratio, to obtain a target ratio. After obtaining the target ratio, vehicle speed may be indicated, and a target engine speed is calculated by multiplying current vehicle speed by the target engine speed to vehicle speed ratio, to obtain a target engine speed. In each case (t3-t4, t4-t5, t5-t6), while the engine speed is increasing to the target speed, the target engine speed to vehicle speed ratio (indicated by plot 425) is maintained substantially constant. While accelerating to the target engine speed, when it is determined that the target engine speed differs from the optimal engine speed by the predetermined threshold, as discussed, the target engine speed to vehicle speed ratio is reset to the current optimal engine speed to vehicle speed ratio, by controlling the target engine speed, indicated by plot 415, to the optimal engine speed, indicated by plot 420. The rapid change in target engine speed to the optimal engine speed at time t4 is denoted by 415*b*, the rapid change in target engine speed to the optimal engine speed at time t5 is denoted by 415*c*, and the rapid change in target engine speed to the optimal engine speed is denoted by 415*d*. Similarly, the rapid change in the target engine speed to vehicle speed ratio, to become the current optimal engine speed to vehicle speed ratio is denoted by 425*b* at time t4, 425*c* at time t5, and 425*d* at time t6.

Furthermore, in each case where the target engine speed is set to the optimal engine speed and the target engine speed to vehicle speed ratio is set to the optimal engine speed to vehicle speed ratio (times t3, t4, t5, and t6), it may be understood that in some examples, a gear ratio in a transmission configured to transfer engine torque to one or more wheels of the vehicle may be shifted or controlled to a lower gear ratio than a previous gear ratio. As discussed above, such examples may include powersplit, series, and/or continuously variable powertrains with the capability of changing gear ratios. It may be further understood that the previous gear ratio may comprise a gear ratio just prior to the setting the target engine speed to the optimal engine speed, and just prior to setting the target engine speed to vehicle speed ratio equal to the optimal engine speed to vehicle speed ratio.

Thus, between time t2-t6, during an acceleration from rest, behavior similar to step ratio behavior is observed, with the engine speed increasing as the vehicle accelerates, with periodic "upshifts" (represented by 415*a-d*, and 425*a-d*) bringing the engine speed back to the optimal engine speed, and accordingly, the target engine speed to vehicle speed ratio back to the optimal engine speed to vehicle speed ratio. Thus, it may be understood that each "upshift" comprises a simulated shift. After each simulated shift, it may be understood that the target ratio is reset to the current optimal ratio, and the new gear ratio is lower than the previous ratio, providing a progression of gear ratios typical of a fixed-ratio transmission.

At time t6, the vehicle operator is no longer requesting vehicle acceleration. As indicated, vehicle speed plateaus between time t6-t7, and the accelerator pedal position remains substantially constant. Thus, between time t6 and t7, it may be understood that the vehicle is being operated in steady-state conditions. Accordingly, between time t6 and t7, it may be understood that the ratio of engine speed to vehicle speed is calculated, and the optimal engine speed is utilized as the engine speed target. With the engine speed target, indicated by plot 415, equaling the optimal engine speed, indicated by plot 420, the target engine speed to vehicle speed ratio, indicated by plot 425, thus becomes the optimal engine speed to vehicle speed ratio, indicated by plot 430.

Turning now to FIG. 5, an example timeline 500 for controlling engine speed in a hybrid vehicle during deceleration conditions, is shown. More specifically, timeline 500 illustrates how engine speed in a hybrid vehicle is controlled during deceleration conditions to simulate downshifts. Timeline 500 includes plot 505, indicating a position of an accelerator pedal (e.g. 192), over time. The accelerator pedal may be pressed down (+) toward a floor of the vehicle, or released (−). Timeline 500 further includes plot 510, indicating vehicle speed, over time. Vehicle speed may increase (+), compared to a stopped vehicle (0), over time. Timeline 500 further includes plot 515, indicating a target engine speed, and plot 520, indicating an optimal engine speed, over time. Engine speed may increase (+), compared to a stopped vehicle (0) over time. Timeline 500 further includes plot 525, indicating a target engine speed to vehicle speed ratio, and plot 530, indicating an optimal engine speed to vehicle speed ratio, over time. The engine speed to vehicle speed ratio may increase (+) or decrease (−), over time.

Between time t0 and t1, the vehicle is in motion, indicated by plot 510, with the engine in operation, indicated by plot 515. The accelerator pedal position is substantially constant between time t0 and t1, indicated by plot 505. In other words, it may be understood that between time t0 and t1, the vehicle is operating in a substantially constant vehicle speed cruise condition, or a steady-state condition. As discussed above, while the vehicle speed is substantially constant due to the accelerator pedal position remaining substantially constant, target engine speed is controlled to the optimal engine speed for fuel economy benefit. In other words, between time t0 and t1, the optimal engine speed is utilized as the engine speed target, thus resulting in the target engine speed to vehicle speed ratio equaling the optimal engine speed to vehicle speed ratio.

At time t1, the accelerator pedal is released by a vehicle operator, indicating a request for decreased wheel torque (corresponding to wheel power) to decelerate the vehicle.

As the vehicle is decelerating, it may be understood that a controller of the vehicle indicates an optimal engine speed to vehicle speed ratio (indicated by plot 530) for fuel economy benefits, and a rate limit is applied to the optimal engine speed to vehicle speed ratio in order to obtain a target engine speed to vehicle speed ratio. Once the target engine speed to vehicle speed ratio has been indicated, vehicle speed may be indicated, and target engine speed may be determined via equation (1) as discussed above.

Accordingly, between time t1 and t2, engine speed is decreased corresponding to the target engine speed determination, indicated by plot 515. Under conditions where the vehicle is decelerating from due to a release of the accelerator pedal, where the engine is decreasing engine speed to the target engine speed, the target engine speed to vehicle speed ratio is maintained substantially constant, as indicated by plot 525 between time t1 and t2. As illustrated, target engine speed, indicated by plot 515, differs from optimal engine speed (for fuel economy benefits), indicated by plot 520. Similarly, the target engine speed to vehicle speed ratio, indicated by plot 525, differs from the optimal engine speed to vehicle speed ratio, indicated by plot 530.

At time t2, it may be understood that the target engine speed differs from the optimal engine speed by a predetermined threshold difference. Accordingly, when such a threshold difference is indicated, target engine speed is rapidly controlled to the current optimal engine speed. The rapid change in target engine speed to the optimal engine speed is denoted as 515*a*. By controlling engine speed to the optimal engine speed, the target engine speed to vehicle speed ratio, indicated by plot 525, is set to a current optimal engine speed to vehicle speed ratio, indicated by plot 530. The rapid change in the target engine speed to vehicle speed ratio, to become the current optimal engine speed to vehicle speed ratio, is denoted as 525*a*.

Between time t2 and t3, accelerator pedal position remains substantially constant. Thus, as described above, target engine speed is controlled to the optimal engine speed for fuel economy benefit. In other words, between time t2 and t3, the optimal engine speed is utilized as the engine speed target, thus resulting in the target engine speed to vehicle speed ratio equaling the optimal engine speed to vehicle speed ratio.

At time t3, the accelerator pedal is released by the vehicle operator, indicating another request for decreased wheel torque (corresponding to wheel power) to decelerate the vehicle. Accordingly, a similar procedure takes place between time t3 and t4, as that discussed above between time t1 and t2. Briefly, a rate limit is applied to an indicated current optimal engine speed to vehicle speed ratio, to obtain a target ratio. After obtaining the target ratio, vehicle speed may be indicated, and a target engine speed is calculated by multiplying current vehicle speed by the target engine speed to vehicle speed ratio, to obtain a target engine speed. While the engine speed is decreasing to the target speed, the target engine speed to vehicle speed ratio is maintained substantially constant. While decelerating to the target engine speed, when it is determined that the target engine speed differs from the optimal engine speed by the predetermined threshold, as discussed, the target engine speed to vehicle speed ratio is reset to the current optimal engine speed to vehicle speed ratio, by controlling the target engine speed, indicated by plot 515, to the optimal engine speed, indicated by plot 520. The rapid change in target engine speed to the optimal engine speed at time t4 is denoted by 515*b*. Similarly, the rapid change in the target engine speed to vehicle speed ratio, to become the current optimal engine speed to vehicle speed ratio, is denoted by 525*b* at time t4.

Furthermore, in each case where the target engine speed is set to the optimal engine speed and the target engine speed to vehicle speed ratio is set to the optimal engine speed to vehicle speed ratio (times t2 and t4), it may be understood that a gear ratio in a transmission configured to transfer engine torque to one or more wheels of the vehicle may be shifted or controlled to a lower gear ratio than a previous gear ratio. It may be understood that the previous gear ratio may comprise a gear ratio just prior to the setting the target engine speed to the optimal engine speed, and just prior to setting the target engine speed to vehicle speed ratio equal to the optimal engine speed to vehicle speed ratio.

Thus, between time t1-t2, and between time t3-t4, during deceleration conditions, behavior similar to step ratio behavior is observed, with the engine speed decreasing as the vehicle decelerates, with periodic "downshifts" (represented by 415*a-d*, and 425*a-d*) bringing the engine speed back to the optimal engine speed, and accordingly, the target engine speed to vehicle speed ratio back to the optimal engine speed to vehicle speed ratio. Thus, it may be understood that each "downshift" comprises a simulated shift. After each simulated shift, it may be understood that the target ratio is reset to the current optimal ratio, and the new gear ratio is lower than the previous ratio, providing a progression of gear ratios typical of a fixed-ratio transmission. In this way, a hybrid vehicle system in which engine speed may be controlled independently of vehicle speed, may be operated by simulating a fixed ratio transmission during accelerations and decelerations, while maintaining an optimal engine speed for fuel economy benefits at steady state operation. As such, engine speed may be correlated with acceleration/deceleration requests from a vehicle operator, in a fashion that is intuitive to a vehicle operator accustomed to a powertrain with a step-ratio transmission. Furthermore, by maintaining the optimal engine speed for fuel economy during steady state operation, fuel economy may be improved.

The technical effect is to recognize that, in response to transients (e.g. accelerations/decelerations during steady state operation), or when accelerating a vehicle from rest, application of a rate limit to an indicated optimal engine speed to vehicle speed ratio may prevent engine speed from changing at a rate that may be unintuitively fast or slow relative to the vehicle acceleration/deceleration. A further technical effect is to recognize that, by applying the rate limit to the optimal engine speed to vehicle speed ratio to determine a target engine speed to vehicle speed ratio, and with a measurement of vehicle speed, a target engine speed may be calculated for transients, or when accelerating from rest. By indicating when the target engine speed differs from an indicated optimal engine speed by a predetermined threshold, and resetting the target engine speed to the optimal engine speed (thus resetting the target engine speed to vehicle speed ratio to the optimal engine speed to vehicle speed ratio) at that point(s), the methodology discussed herein enables the simulation of a fixed ratio transmission during accelerations and decelerations.

The systems described herein, and with reference to FIGS. 1A-1B, along with the methods described herein, and with reference to FIG. 2, may enable one or more systems and one or more methods. In one example, a method comprises controlling an engine that propels a vehicle to an optimal engine speed for fuel economy during steady-state conditions; and responsive to an acceleration or a deceleration request, applying a rate limit to an optimal engine speed to vehicle speed (E/V) ratio for fuel economy to obtain a target E/V ratio, and controlling the engine to a target speed provided the target speed is below a threshold difference from optimal engine speed. In a first example of the method, the method further includes wherein the vehicle comprises a hybrid vehicle where engine speed is controllable independent of vehicle speed. A second example of the method optionally includes the first example, and further includes wherein the hybrid vehicle comprises a series hybrid or a power-split hybrid. A third example of the method optionally includes any one or more or each of the first and second examples, and further comprises responsive to the target speed beyond the threshold difference from optimal engine speed, setting the target E/V ratio equal to the optimal E/V ratio, and controlling the engine to the optimal speed based on the optimal E/V ratio. A fourth example of the method optionally includes any one or more or each of the first through third examples, and further includes wherein setting the target E/V ratio equal to the optimal E/V ratio and controlling the engine to the optimal engine speed emulates a gear shift in a fixed ratio transmission. A fifth example of the method optionally includes any one or more or each of the first through fourth examples, and further comprises shifting a gear ratio in a transmission configured to transfer engine torque to one or more wheels of the vehicle to a lower gear ratio than a previous gear ratio concurrent with setting the target E/V ratio equal to the optimal E/V ratio and controlling the engine to the optimal speed based on the optimal E/V ratio. A sixth example of the method optionally includes any one or more or each of the first through fifth examples, and further includes wherein controlling the engine to the target speed provided the target speed is below the threshold difference from optimal engine speed further comprises coupling engine speed and a rate of change of engine speed to vehicle speed. A seventh example of the method optionally includes any one or more or each of the first through sixth examples, and further includes wherein controlling the engine to the target speed includes determining the target speed via multiplying a current vehicle speed by the target E/V ratio to obtain the target engine speed. An eighth example of the method optionally includes any one or more or each of the first through seventh examples, and further includes wherein controlling the engine to the optimal engine speed for fuel economy during steady-state conditions further comprises operating the vehicle at the optimal engine speed to vehicle speed ratio. A ninth example of the method optionally includes any one or more or each of the first through eighth examples, and further includes wherein the optimal engine speed to vehicle speed ratio for fuel economy, and the optimal engine speed for fuel economy, are a function of one or more of vehicle speed, a state of charge of an onboard energy storage device, a temperature of the onboard energy storage device, a transmission gearing state, a storage level of fuel for the engine, and/or a vehicle-operator requested wheel torque.

An example of a system for a hybrid vehicle comprises an engine configured to propel the vehicle; a transmission configured to transfer torque from the engine to one or more vehicle wheels via a plurality of gear ratios; and a controller storing instructions in non-transitory memory that, when executed, cause the controller to: couple a rate of change of engine speed to vehicle speed in response to a vehicle operator-requested increase or decrease in a wheel torque demand from a steady-state condition until a target engine speed differs from an optimal engine speed for fuel economy benefits by a predetermined threshold, at which point engine speed is controlled to the optimal engine speed. In a first example of the system, the system further includes wherein the controller stores additional instructions for determining the target engine speed by applying a rate limit to an optimal engine speed to vehicle speed ratio, to obtain a target engine speed to vehicle speed ratio, where determining the target engine speed involves multiplying vehicle speed by the target engine speed to vehicle speed ratio to arrive at the target engine speed. A second example of the system optionally includes the first example, and further includes wherein the controller stores additional instructions to shift a transmission gear ratio to a lower gear ratio than a previous gear ratio concurrent with controlling engine speed to the optimal engine speed. A third example of the system optionally includes any one or more or each of the first and second examples, and further includes wherein the controller stores additional instructions to maintain engine speed at the optimal engine speed during steady-state conditions where an increase or decrease in wheel torque demand is not requested. A fourth example of the system optionally includes any one or more or each of the first through third examples, and further includes wherein the optimal engine speed is a function of one or more of vehicle speed, a state of charge of an onboard energy storage device, a temperature of the onboard energy storage device, a transmission gearing state, a storage level of fuel for the engine, and/or a vehicle-operator requested wheel torque.

Another example of a method comprises in a first condition, maintaining a speed of an engine configured to propel a vehicle at an optimal engine speed so as to maintain an engine speed to vehicle speed ratio at an optimal engine speed to vehicle speed ratio for fuel economy; and in a second condition, controlling an engine speed to a target engine speed that is not the optimal engine speed while the target speed is within a predetermined threshold difference from the optimal engine speed, where the engine speed is controlled to the optimal engine speed corresponding to the optimal engine speed to vehicle speed ratio for fuel economy responsive to the target engine speed being beyond the predetermined threshold difference from the optimal engine speed. In a first example of the method, the method further includes wherein the first condition includes a steady state condition where vehicle speed is substantially constant; and wherein the second condition includes a vehicle acceleration or deceleration request. A second example of the method optionally includes the first example, and further includes wherein the optimal engine speed for fuel economy is a function of driver demand and a storage level of an onboard energy storage device. A third example of the method optionally includes any one or more or each of the first and second examples, and further includes wherein controlling the engine speed to the target engine speed in the second condition includes applying a rate limit to the optimal engine speed to vehicle speed ratio to obtain a target engine speed to vehicle speed ratio, wherein the target speed is obtained via multiplying vehicle speed by the target engine speed to vehicle speed ratio. A fourth example of the method optionally includes any one or more or each of the first through third examples, and further comprises controlling a gear ratio of a transmission configured to transfer torque from an engine to one or more wheels of the vehicle to a lower gear ratio than a previous ratio while controlling the engine speed to the optimal engine speed in the second condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   controlling an engine that propels a vehicle to a first optimal engine speed for fuel economy during steady-state conditions, the first optimal engine speed for fuel economy based on an optimal engine speed to vehicle speed (E/V) ratio for fuel economy; and
   responsive to an acceleration or deceleration request, applying a rate limit to the optimal E/V ratio to obtain a target E/V ratio and determining a target engine speed based on the target E/V ratio and a current vehicle speed, and responsive to the target engine speed being within a threshold range of a second optimal engine speed, controlling the engine to the target speed, and where the second optimal engine speed is based on the optimal E/V ratio and the current vehicle speed and the target speed deviates from the optimal engine speed.

2. The method of claim 1, wherein the vehicle comprises a hybrid vehicle where engine speed is controllable independent of vehicle speed.

3. The method of claim 2, wherein the hybrid vehicle comprises a series hybrid or a power-split hybrid.

4. The method of claim 1, further comprising:
   responsive to the target speed being outside the threshold range from the second optimal engine speed, setting the target E/V ratio equal to the optimal E/V ratio, and controlling the engine to the second optimal engine speed based on the optimal E/V ratio.

5. The method of claim 1, wherein the optimal E/V ratio changes with a first rate of change following the acceleration or deceleration request, and wherein applying the rate limit to the optimal E/V ratio for fuel economy to obtain the target E/V ratio comprises rate limiting the first rate of change to obtain the target EN ratio, the target E/V ratio having a second rate of change that is different than the first rate of change.

6. The method of claim 4, further comprising shifting a gear ratio in a transmission configured to transfer engine torque to one or more wheels of the vehicle to a lower gear ratio than a previous gear ratio concurrent with setting the target E/V ratio equal to the optimal E/V ratio and controlling the engine to the second optimal engine speed based on the optimal E/V ratio.

7. The method of claim 1, wherein the optimal E/V ratio changes as operator-requested wheel torque changes.

8. The method of claim 1, wherein controlling the engine to the target engine speed includes determining the target engine speed via multiplying the current vehicle speed by the target E/V ratio to obtain the target engine speed.

9. The method of claim 1, wherein controlling the engine to the optimal engine speed for fuel economy during steady-state conditions further comprises operating the vehicle at the optimal E/V ratio.

10. The method of claim 9, wherein the optimal E/V ratio and the optimal engine speed for fuel economy are a function of one or more of vehicle speed, a state of charge of an onboard energy storage device, a temperature of the onboard energy storage device, a transmission gearing state, a storage level of fuel for the engine, and/or a vehicle-operator requested wheel torque.

* * * * *